(12) United States Patent
Buxbaum et al.

(10) Patent No.: US 9,189,529 B2
(45) Date of Patent: Nov. 17, 2015

(54) QUEUE MONITORING AND VISUALIZATION

(71) Applicant: Ab Initio Technology LLC, Lexington, MA (US)

(72) Inventors: Mark Buxbaum, Acton, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 136 days.

(21) Appl. No.: 13/834,491

(22) Filed: Mar. 15, 2013

(65) Prior Publication Data

US 2014/0229480 A1 Aug. 14, 2014

Related U.S. Application Data

(60) Provisional application No. 61/764,794, filed on Feb. 14, 2013.

(51) Int. Cl.
*G06F 17/00* (2006.01)
*G06F 17/30* (2006.01)

(52) U.S. Cl.
CPC .................. *G06F 17/30563* (2013.01)

(58) Field of Classification Search
CPC . G06F 17/30247; G06F 17/3028; G06F 3/14; G06F 9/546; G06F 15/16; G06F 17/30471; G06F 2209/548; G06F 17/30; G06F 17/30241; G06F 21/602
See application file for complete search history.

(56) References Cited

U.S. PATENT DOCUMENTS

| | | | |
|---|---|---|---|
| 5,826,104 A | 10/1998 | Rifkin | |
| 6,772,202 B2 | 8/2004 | Wright | |
| 7,467,383 B2 | 12/2008 | Inchingolo et al. | |
| 2003/0120681 A1 | 6/2003 | Baclawski | |
| 2011/0055388 A1 | 3/2011 | Yumerefendi et al. | |
| 2012/0275307 A1 | 11/2012 | Godbole et al. | |
| 2014/0105218 A1* | 4/2014 | Anand et al. | 370/412 |

OTHER PUBLICATIONS

International Search Report and Written Opinion, in related PCT application No. PCT/US14/15771, mailed Jun. 27, 2014.

* cited by examiner

*Primary Examiner* — Truong Vo
(74) *Attorney, Agent, or Firm* — Fish & Richardson P.C.

(57) ABSTRACT

A method includes receiving information provided by a data processing application during execution of the data processing application. The information is indicative of at least one of a source of data for the data processing application and a destination of data from the data processing application. The method includes dynamically analyzing the information during execution of the data processing application to identify a queue in communication with the data processing application; and dynamically analyzing the information during execution of the data processing application to identify a relationship between the data processing application and the queue, including at least one of identifying that the queue is the source of data for the data processing application and identifying that the queue is the destination of data from the data processing application.

61 Claims, 10 Drawing Sheets

FIG. 6

| Name | Host | Status | Issues | Records | In Reco... | On Disk | Files | Write El... | Read El... | Skew | Job | Job... | Job... |
|---|---|---|---|---|---|---|---|---|---|---|---|---|---|
| ⊟ testqueue1 | abdemo | 🗊 | | 398 | 6 kB | 10 kB | 398 | 119 hours | 120 hours | 0% | | | |
| *publisher* | | | | | | | | | | | | | |
| one | | | | 0 | 0 bytes | 0 bytes | 0 | | 119 hours | 0% | publish1.pset | ● | ·· |
| two | | | | 398 | 6 kB | 10 kB | 398 | 119 hours | 120 hours | 0% | subscribe1.pset | ● | |
| ⊟ testqueue2 | abdemo | 🗊 | | 0 | 0 bytes | 0 bytes | 0 | | 119 hours | 0% | subscribe2.pset | ○ | |
| ⊟ testqueue3 | abdemo | 🗊 | | 0 | 0 bytes | 0 bytes | 0 | 119 hours | 119 hours | 0% | subscribe1.pset | ● | |
| *publisher* | | | | | | | | | | | | | |
| one | | | | 0 | 0 bytes | 0 bytes | 0 | | 119 hours | 0% | subscribe3.pset | ● | ·· |
| two | | | | 0 | 0 bytes | 0 bytes | 0 | | | 0% | subscribe2.pset | ○ | ·· |
| | | | | | | | | | 119 hours | | subscribe4.pset | ● | |

FIG. 8

| Name | Job | Status | Issues | Compo... |
|---|---|---|---|---|
| publisher | publish1.pset | ● | | Publish |
| one | subscribe1.pset | ● | | Subscrib |
| two | subscribe2.pset | ○ | : | Subscrib |

Details For Queue: testqueue1    800

Edit | Remove | ?

Info | Publisher and Subscribers | Metrics

Details for Jobs: subscribe2.pset @ 01/07 15:12:49 – 15:12:53

× Delete | ▲ | ❓ 🕐                                                               10                                                                ✕

| Info | Output | Metric Values | Queues | Operational Settings | Schedule | Other Dependencies |

| Name | Subscriber | Graph Component | Access |
|---|---|---|---|
| testqueue3 | | Publish | publisher |
| testqueue1 | two | Subscribe | subscriber |

FIG. 10

QUEUE MONITORING AND VISUALIZATION

CLAIM OF PRIORITY

This application claims priority under 35 USC §119(e) to U.S. Patent Application Ser. No. 61/764,794, filed on Feb. 14, 2013, the entire contents of which are hereby incorporated by reference.

BACKGROUND

This description relates to queue monitoring and visualization, for instance in a data processing environment.

Enterprises use complex data processing systems, such as data warehousing, customer relationship management, and data mining, to manage data. In many data processing systems, data are pulled from many different data sources, such as database files, operational systems, flat files, the Internet, etc, into a central repository. Often, data are transformed before being loaded in the data system. Transformation may include cleansing, integration, and extraction. To keep track of data, its sources, and the transformations that have happened to the data stored in a data system, metadata can be used. Metadata (sometimes called "data about data") are data that describe other data's attributes, format, origins, histories, inter-relationships, etc. Metadata management can play a central role in complex data processing systems.

Sometimes a database user may want to investigate how certain data are derived from different data sources. For example, a database user may want to know how a dataset or data object was generated or from which source a dataset or data object was imported. Tracing a dataset back to sources from which it is derived is called data lineage tracing (or "upstream data lineage tracing"). Sometimes a database user may want to investigate how certain datasets have been used (called "downstream data lineage tracing" or "impact analysis"), for example, which application has read a given dataset. A database user may also be interested in knowing how a dataset is related to other datasets. For example, a user may want to know if a dataset is modified, what tables will be affected, etc.

SUMMARY

In a general aspect, a computer-implemented method includes receiving information provided by a data processing application during execution of the data processing application. The information is indicative of at least one of a source of data for the data processing application and a destination of data from the data processing application. The method includes dynamically analyzing the information during execution of the data processing application to identify a queue in communication with the data processing application. The method includes dynamically analyzing the information during execution of the data processing application to identify a relationship between the data processing application and the queue, including at least one of identifying that the queue is the source of data for the data processing application and identifying that the queue is the destination of data from the data processing application.

Embodiments may include one or more of the following.

The information indicative of at least one of the source of data and the destination of data includes an identifier of the queue.

The method includes dynamically determining a status of the queue during execution of the data processing application. In some cases, the method includes providing a notification based on the status of the queue. In some cases, the status includes at least one of number of records in the queue and an elapsed time associated with the queue.

The method includes determining a status of the data processing application.

The method includes receiving an input identifying the queue. In some cases, the method includes identifying the data processing application based on the processing and based on the input identifying the queue.

The one or more data processing applications include computation graphs.

The method includes generating a visual representation of the data processing application, the queue, and the relationships between the data processing application and the queue. In some cases, the method includes displaying the visual representation on a user interface. In some cases, the visual representation includes a representation of a status of the queue.

In a general aspect, software stored on a computer-readable medium includes instructions for causing a computer system to receive information provided by a data processing application during execution of the data processing application. The information is indicative of at least one of a source of data for the data processing application and a destination of data from the data processing application. The software includes instructions for causing the computer system to dynamically analyze the information during execution of the data processing application to identify a queue in communication with the data processing application; and dynamically analyze the information during execution of the data processing application to identify a relationship between the data processing application and the queue, including at least one of identifying that the queue is the source of data for the data processing application and identifying that the queue is the destination of data from the data processing application.

In a general aspect, a computing system includes an input port configured to receive information provided by a data processing application during execution of the data processing application. The information is indicative of at least one of a source of data for the data processing application and a destination of data from the data processing application. The system includes at least one processor configured to dynamically analyze the information during execution of the data processing application to identify a queue in communication with the data processing application; and dynamically analyze the information during execution of the data processing application to identify a relationship between the data processing application and the queue, including at least one of identifying that the queue is the source of data for the data processing application and identifying that the queue is the destination of data from the data processing application.

In a general aspect, a system includes means for receiving information provided by a data processing application during execution of the data processing application. The information is indicative of at least one of a source of data for the data processing application and a destination of data from the data processing application. The system includes means for dynamically analyzing the information during execution of the data processing application to identify a queue in communication with the data processing application; and means for dynamically analyzing the information during execution of the data processing application to identify a relationship between the data processing application and the queue, including at least one of identifying that the queue is the source of data for the data processing application and identifying that the queue is the destination of data from the data processing application.

In a general aspect, a computer-implemented method includes receiving, from a data processing application during execution of the data processing application, information indicative of a relationship between the data processing application and a queue. The relationship includes at least one of the queue being a source of data for the data processing application and the queue being a destination of data from the data processing application. The method includes generating a graphical representation of the data processing application, the queue, and the relationship between the data processing application and the queue; and displaying the graphical representation on a user interface during execution of the data processing application.

Embodiments may include one or more of the following.

The graphical representation includes a first node to represent the data processing application, a second node to represent the queue, and a connection between the data processing application and the queue to represent the relationship. In some cases, the method includes displaying information about the data processing application responsive to user selection of the first node. In some cases, the method includes displaying information about the queue responsive to user selection of the second node.

The method includes dynamically determining a dynamic status of the queue during execution of the data processing system. In some cases, the graphical representation includes a representation of the status of the queue. In some cases, the method includes providing a notification based on the status of the queue. In some cases, the status of the queue includes at least one of a number of records in the first queue and an elapsed time associated with the first queue.

The method includes dynamically determining a status of the data processing application during execution of the data processing application. In some cases, the graphical representation includes a representation of the status of the data processing application.

The method includes receiving, from a plurality of data processing applications, information indicative of a relationship between each data processing application and at least one corresponding. Generating a graphical representation includes generating a graphical representation of the plurality of data processing applications, the plurality of queues, and the relationships.

Receiving information includes receiving information provided by the data processing application during execution of the data processing application. The information is indicative of at least one of a source of data for the data processing application and a destination of data from the data processing application. Receiving information includes dynamically analyzing the information during execution of the data processing application to identify the queue and the relationship.

In a general aspect, software stored on a computer-readable medium includes instructions for causing a computing system to receive, from a data processing application during execution of the data processing application, information indicative of a relationship between the data processing application and a queue. The relationship includes at least one of the queue being a source of data for the data processing application and the queue being a destination of data from the data processing application. The software includes instructions for causing the computing system to generate a graphical representation of the data processing application, the queue, and the relationship between the data processing application and the queue; and display the graphical representation on a user interface during execution of the data processing application.

In a general aspect, a computing system includes an input port configured to receive, from a data processing application during execution of the data processing application, information indicative of a relationship between the data processing application and a queue. The relationship includes at least one of the queue being a source of data for the data processing application and the queue being a destination of data from the data processing application. The computing system includes a processor configured to generate a graphical representation of the data processing application, the queue, and the relationship between the data processing application and the queue; and display the graphical representation on a user interface during execution of the data processing application.

In a general aspect, a computing system includes means for receiving, from a data processing application during execution of the data processing application, information indicative of a relationship between the data processing application and a queue. The relationship includes at least one of the queue being a source of data for the data processing application and the queue being a destination of data from the data processing application. The computing system includes means for generating a graphical representation of the data processing application, the queue, and the relationship between the data processing application and the queue; and means for displaying the graphical representation on a user interface during execution of the data processing application.

In a general aspect, a computer-implemented method includes receiving information provided by a data processing application during execution of the data processing application. The information is indicative of at least one of a source of data for the data processing application and a destination of data from the data processing application. The method includes dynamically analyzing the information during execution of the data processing application to identify a queue in communication with to the data processing application and hosted on a third computer system. The method includes dynamically analyzing the information during execution of the data processing application to identify a relationship between the data processing application and the queue, including at least one of identifying that the queue is the source of data for the data processing application and identifying that the queue is the destination of data from the data processing application. The method includes generating a graphical representation of the data processing application, the queue, and the relationship between the data processing application and the queue; and displaying the graphical representation on a user interface during execution of the data processing application.

Aspects can have one or more of the following advantages. The approach to queue monitoring and visualization described herein presents a visual representation of data processing occurring on one or more disparate computing systems. The visual representation of relationships between data processing applications and queues can be easy to understand and manipulate. If an error occurs during execution of a job, the status of the data processing applications and queues involved in processing the job can be visualized so that the user can understand the nature of the error.

DESCRIPTION OF DRAWINGS

FIGS. 5-10 are example visual representations of a data processing environment.

DESCRIPTION

In a data processing environment, data processing applications perform various processes on input data, e.g., to analyze or manipulate the data. Data processing applications in a data processing environment may read input data from a queue and/or write output data to a queue, which can act as a buffer to control the flow of data between data processing applications. Relationships between data processing applications and queues can be automatically and dynamically detected in real time, i.e., during execution of the data processing applications. A visual representation can be generated that depicts the data processing applications, the queues, and their relationships in real time, i.e., during execution of the data processing application. Real time status information indicative of the performance of the data processing applications and/or the queues can also be dynamically detected and displayed in the visual representation.

Figure 1:
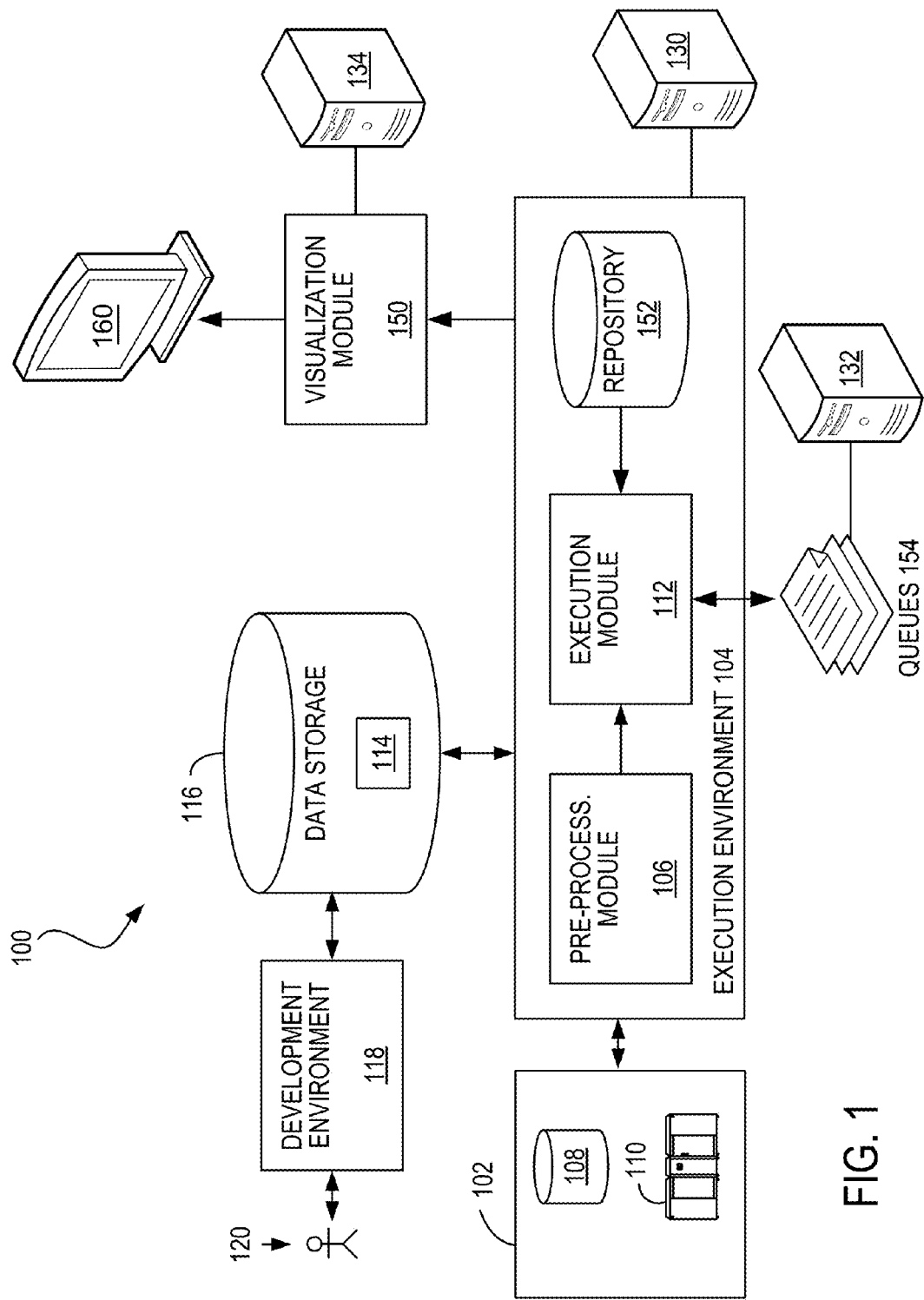
FIG. 1 is a block diagram of a computing system.

FIG. 1 shows an example data processing system 100 in which the monitoring and visualization techniques described herein can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes a pre-processing module 106 and an execution module 112. The execution environment 104 may be hosted on a computer system 130, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The pre-processing module 106 reads data from the data source 102. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The execution module 112 processes the data read from the data source by the pre-processing module 106. The execution module 112 includes one or more data processing applications to execute jobs, i.e., to perform particular processes on the data. Metadata associated with the data processing applications of the execution module 112 can be stored in a data repository 152, such as a database, a data table, or another type of data structure. The resulting output data 114 from the execution module 112 may be stored back in the data source 102 or in a data storage system 116 accessible to the execution environment 104, or otherwise used.

The data processing applications of the execution module 112 may read data from and/or write data to one or more queues 154. Queues 154 can be considered data structures that provide a mechanism to manage the exchange of data between data processing applications. Metadata associated with a data processing application (e.g., stored in the repository 152) identifies the queue(s) from which the data processing application reads data (also referred to as "subscribing") and to which the data processing application writes data (also referred to as "publishing"). In some examples, metadata associated with a queue 154 may identify the data processing applications publishing and/or subscribing to that queue. In the example shown, the queues 154 are hosted on a computer system 132 different from the computer system 130 hosting the execution environment 104. In some examples, the queues 154 may be hosted on the same computer system as the execution environment 104.

The data storage system 116 may be accessible to a development environment 118 in which a developer 120 is able to configure the data processing applications and/or the queues. The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

A visualization module 150 generates a visual representation of the data processing applications executed by the execution module 112 and the associated queues 154 (referred to herein as a "data processing environment") during execution of the data processing applications. The visual representation may be a graphical representation, a tabular representation, or another type of representation. The visual representation may include, for instance, representations of data processing applications, queues, relationships between data processing applications and queues, status information about data processing applications and/or queues, or other information. In the example shown, the visualization module 150 is are hosted on a computer system 134 different from the computer system 130 hosting the execution environment 104 and the computer system 132 hosting the queues 154. In some examples, the visualization module 150 may be hosted on the same computer system as the execution environment 104 and/or the same computer system as the queues 154.

To generate a visual representation of a data processing environment, the metadata associated with the data processing applications (e.g., the metadata stored in the data repository 152) can be accessed to dynamically identify relationships between the data processing applications and the queues during execution of the data processing applications. For instance, the queues to which one or more of the data processing applications publish and/or subscribe can be identified using the metadata associated with the data processing applications. In some examples, metadata associated with the queues can also be accessed, such as queue metadata stored in the data repository 152 and/or queue data stored in a queue interface. Based on the identified relationships, a visual representation of the data processing environment can be generated for display on a user interface 160. For instance, in a graphical representation, nodes may be used to represent data processing applications and queues, and lines connecting nodes may be used to represent relationships between the data processing applications and queues. In a tabular representation, rows and columns of data may be used to represent information related to the data processing applications and queues.

The visual representation of the data processing environment may also include dynamically updated status information about the data processing applications and/or queues. In some examples, external input, e.g., from a user, may identify which data processing applications and/or queues to monitor. In some examples, some or all of the data processing applications executed by the execution module 112 and their associated queues may be automatically indicated for monitoring. In some examples, identifiers of data processing applications and/or queues to be monitored may be stored in a monitoring database. Metadata associated with the data processing applications and/or queues identified in the monitoring database can be accessed to determine status information.

Figure 2:
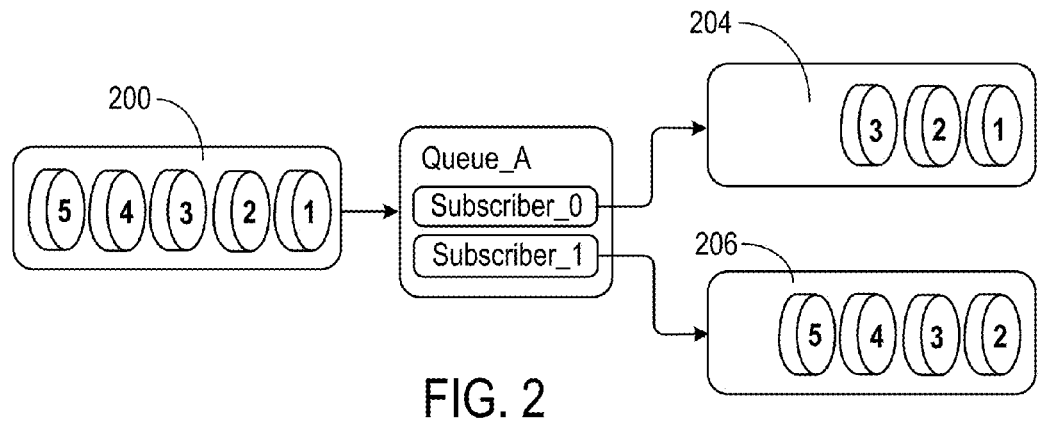
FIG. 2 is a diagram of relationships between data processing applications and a queue.

Referring to FIG. 2, in an example of a relationship between data processing applications and queues, a first data processing application 200 publishes data to a queue 202. Two downstream data processing applications 204 and 206 subscribe to the queue 202, for example, to be provided data from the queue. The relationship between the queue 202 and the first data processing application 200 (i.e., the first data processing application 200 publishes to the queue 202) can be determined by an analysis of metadata associated with the data processing application 200, the queue 202, both the data processing application and the queue, etc. For instance, the data processing application 200 may have associated metadata that specifies that the data processing application 200 publishes to queue 202. The relationship between the queue 202 and the downstream data processing applications 204, 206 (i.e., the downstream data processing applications 204, 206 subscribe to the queue 202) can likewise be determined by an analysis of metadata associated with the data processing applications 204, 206, the queue 202, both the data processing application and the queue, etc.

Queues can act as buffers to control the flow of data from an upstream data processing application to a downstream data processing application. For instance, if the first data processing application 200 publishes data to the queue 202 faster than the downstream data processing applications 204, 206 can read data from the queue 202, the data can accumulate in the queue 202 until the downstream data processing applications 204, 206 are ready to read the data. Queues may also substantially maintain the order of incoming and outgoing data records. For instance, in a first-in-first-out queue, the first data record published to the queue can be the first record to emerge when the queue is read. When there are multiple data processing applications publishing or subscribing to a single queue, the queue can help ensure that data records are properly collected and distributed. For instance, the queue 202 can ensures that data published to the queue 202 by the first data processing application 200 is distributed appropriately to the downstream data processing applications 204, 206.

Figure 3:
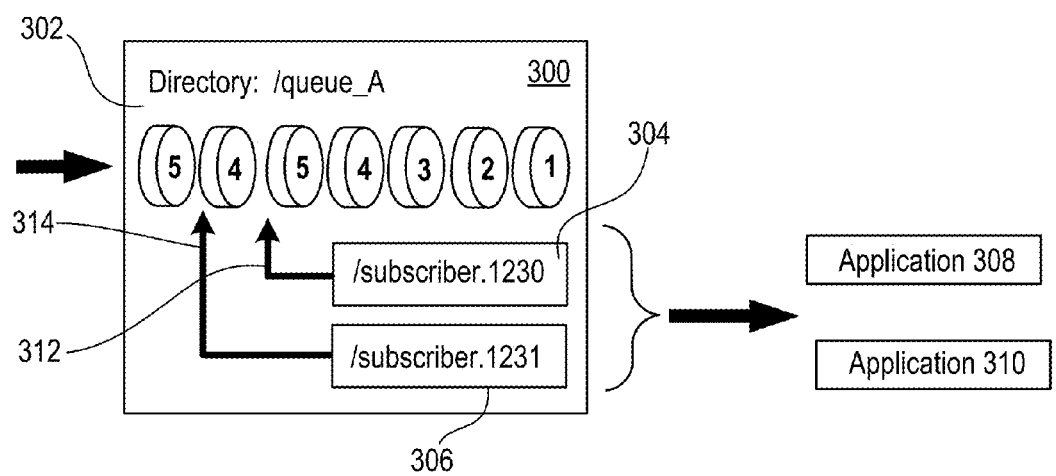
FIG. 3 is a diagram of a queue.

A queue may be considered a data structure that may include a directory or multidirectory in a file system. The data in the queue, which may be compressed data, resides in the queue directory on disk. As data is published to the queue, the data records are landed to disk in the queue directory. For instance, referring to FIG. 3, a queue 300 is embodied by a directory /queue_A in a file system. Data records 302 received from a publishing data processing application reside in the directory /queue_A.

Each queue directory may have one or more subdirectories 304, 306, also referred to as subscribers. Each subscriber 304, 306 links to data records in the directory /queue_A that are to be provided to a corresponding data processing application 308, 310, respectively, that subscribes to the queue 300. As a subscribing data processing application consumes a data record, a pointer 312, 314, also referred to as a cursor, is moved in the associated subscriber subdirectory 304, 306, respectively. The cursor serves as a kind of bookmark that points to the next data record to be provided to the subscribing data processing application 308, 310 and shows how much of the queued data the corresponding subscribing data processing application has processed. Each subscriber directory 304, 306 is assigned its own cursor 312, 314 because each subscribing data processing application 308, 310 may consume data records at its own rate. Thus, for instance, in the illustrated example, the data processing application 308 corresponding to the subscriber subdirectory 304 has processed through data record 5, as indicated by the cursor 312; and the data processing application 310 corresponding to the subscriber subdirectory 306 has processed through data record 6, as indicated by the cursor 314. The cursor 312, 314 may be used as a recovery mechanism: if a subscribing data processing application fails, the position of the corresponding cursor can be used to resume processing from the last checkpoint or processing phase. After all of the subscribers to a queue have processed a particular data record, the data record may be deleted.

During the commit portion of a write transaction, a publishing data processing application may finish writing a data file to the queue directory on disk. Each data file may contain one or more data records. Each data record contains a specific amount of data in bytes. In some cases, the queue data may be compressed, in which case the number of bytes contained in the records may be greater than the number of bytes stored on disk.

A variety of performance metrics can be used to monitor the status of queues and/or data processing applications. For instance, example performance metrics that can be used to monitor the status of a queue may include, but are not limited to, one or more of the following:

MAX_DISK_SPACE. The number of bytes on disk for the subscriber using the most disk space.

MAX_FILES. The number of files for the subscriber having the most files remaining to process.

MAX_RECORDS. The number of records for the subscriber having the most records remaining to process.

MAX_RECORDS_SPACE. The number of bytes on disk consumed by the records for the subscriber having the most records remaining to process. If the queue data is compressed, this value may be different than the MAX_DISK_SPACE value.

MAX_READ_ELAPSED. The time (e.g., in seconds) since data has been read from the queue by the subscriber that has waited the longest to read that data.

WRITE_ELAPSED. The time (e.g., in seconds) since data was last written to the queue.

MAX_SKEW. The ratio of the largest partition to the smallest partition for the subscriber with the largest such ratio, e.g., expressed as a percentage.

Example performance metrics that can be used to monitor the status of a data processing application may include, but are not limited to, one or more of the following:

DISK_SPACE. The number of bytes left on disk for the subscriber to process.

FILES. The number of files left on disk for the subscriber to process.

RECORDS. The number of records left on disk for the subscriber to process.

RECORDS_SPACE. The number of uncompressed bytes in the records left on disk for the subscriber to process. If the queue data is compressed, this value may be different than the MAX_DISK_SPACE value.

READ_ELAPSED. The elapsed time (e.g., in seconds) since the subscribing data processing application last read data from the queue.

SKEW. The ratio of the largest partition to the smallest partition for the subscriber, e.g., expressed as a percentage.

A visual representation of the dynamically detected relationships between data processing applications and queues (i.e., the data processing environment) can be generated and presented on a user interface. The visual representation may be interactive, e.g., provided in a web browser, such that a user may browse the data processing applications and queues, create new and/or alter existing data processing applications, specify parameters for data processing applications, schedule jobs, and perform other actions. Form-based browser screens may be generated for a user to search for and view data processing applications and queues and information about data processing applications and queues. Various graphical elements may be utilized, for example, Relationships may be represented as graphical lines connecting graphical nodes that represent metadata objects or groupings of metadata objects.

The visual representation of a data processing environment may provide information about the status of queues and/or data processing applications included in the visual representation. For instance, the visual representation may include indications about whether a queue has active publishers, active subscribers, both, neither, etc. The visual representation may include indications about whether a data processing application is a publisher and/or a subscriber to one or more queues. Warnings, errors, and other runtime status indicators for queues and or data processing applications can be displayed. Representations of data processing jobs publishing to a queue, subscribing to a queue, etc., may also be displayed. Performance metrics, such as those listed above, may be displayed graphically or in a table format. In some arrangements, performance metric thresholds can be established for queues and/or data processing applications such that alerts (e.g., alerts within the visual representation, audio alerts, or other types of alerts) can be provided if one or more associated performance metrics violates its corresponding threshold.

Figure 4:
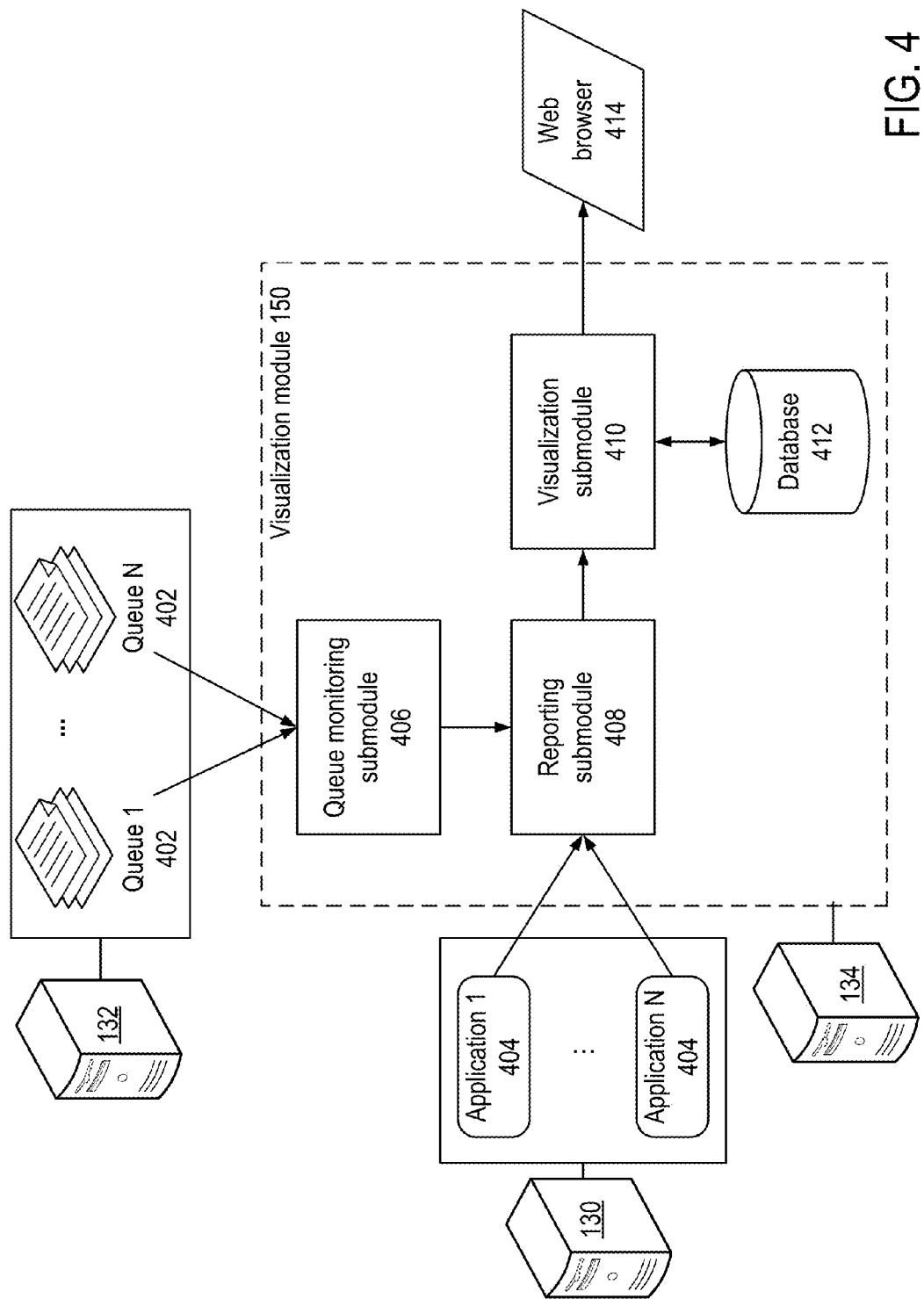
FIG. 4 is a block diagram of a visualization system.

Referring to FIG. 4, the visualization module 150 (see also FIG. 1) generates a visual representation of a data processing environment that includes, for example, one or more queues 402 and one or more data processing applications 404.

A queue monitoring submodule 406 queries the interface of each queue 402 (identified as queues 1-N) in the data processing environment to determine the status of each queue 402. The queue monitoring submodule 406 may query corresponding interfaces of the queues periodically, e.g., every ten minutes. Status information may include, for instance, one or more of the performance metrics listed above. The queue monitoring submodule 406 provides data about the status of each queue 402 to a reporting submodule 408.

In some examples, data processing applications announce when they read from or write to a queue, e.g., via metadata associated with the data processing applications. Data processing applications 404 (identified as data processing applications 1-N) provide metadata indicative of the identity of the queues they read from or write to along with status and tracking metadata to the reporting submodule 408. In some examples, the reporting submodule 408 accesses the metadata associated with the data processing applications 404 to identify queues and to determine status and tracking metadata.

The reporting submodule 408 aggregates information from the data processing applications 404 and the queue monitoring module 406 and forwards the aggregated information to a visualization submodule 410. The visualization submodule 410 stores the received data about the queues 402 and the data processing applications 404 of the data processing environment in a database 412. The visualization submodule 410 correlates information about the queues 402 and information about the data processing applications 404 to identify relationships between individual queues 402 and individual data processing applications 404 (e.g., to identify which data processing applications publish to and subscribe to which queues). Based on the correlations between queues 402 and data processing applications 404, the visualization submodule 410 generates a representation of the data processing environment. The representation may represent, e.g., the relationships between the queues 402 and the data processing applications 404, the status of the queues and/or the data processing applications, and/or other information. The visualization submodule 410 typically provides the representation to a display interface, such as a web browser 414, for rendering as a visual representation, such as a graphical representation or a tabular representation.

Figure 5:
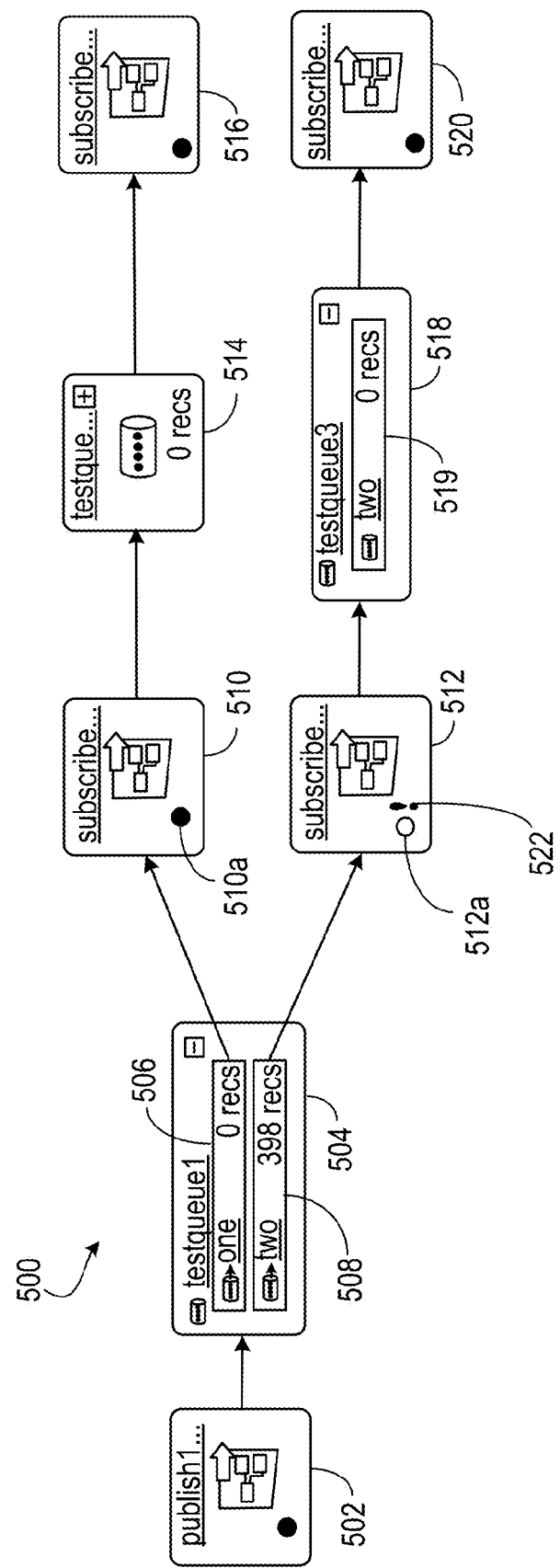

FIG. 5 shows an example of a graphical representation 500 (also referred to as a queue connections diagram) of a data processing environment. The queue connections diagram 500 shows schematically the connections between data processing applications and queues, which are represented as nodes. The queue connections diagram 500 depicts a data processing application 502 (labeled "publish1.pset") publishing (writing) to a queue 504 (labeled "testqueue"). The queue 504 has two subscribers 506, 508 (a first labeled "one" and a second labeled "two"). Each subscriber 506, 508 corresponds to a data processing application 510 (labeled "subscribe1.pset") and 512 (labeled "subscribe2.pset"), respectively, that is reading from (subscribing to) the queue 504 (labeled "testqueue"). The data processing application 510 (labeled "subscribe1.pset") publishes to a queue 514 (labeled "testqueue2"), which has a subscriber (not shown) corresponding to a further data processing application 516 (labeled "subscribe3.pset"). The data processing application 512 (labeled subscribe2.pset") publishes to a queue 518 (labeled "testqueue3"), which has a subscriber 519 (labeled "one") corresponding to a further data processing application 520 (labeled (subscribe4.pset").

A queue connections diagram, such as the queue connections diagram 500, includes information about the queues and data processing applications depicted in the queue connections diagram. In some examples, a user may select the information to be displayed in the queue connections diagram. For instance, example information included in a queue connections diagram may include some or all of the following information:

The name of each queue depicted in the queue connections diagram. In some examples, the queue name may be set by default to be the same as the name of the directory in which the queue was created.

Publisher and subscriber activity. Each queue has an input and an output connected to one or more publishers and one or more subscribers, respectively. An indicator, such as an icon or a color indicator, may indicate whether each publisher or subscriber is running. For instance, if one or more publishers to a queue are running, the input side of the queue may appear in green. If one or more subscribers to a queue are running, the output side of the queue may appear in green.

Queue or data processing application issues. Issues, such as errors or alerts, associated with a queue or a data processing application, may be depicted by indicators, such as icons, color indicators, or other types of indicators. For instance, an indicator may indicate the number of issues associated with a queue or a data processing application, the degree of severity of the most severe issue, or another indication of an issue.

Performance metrics, such as the performance metrics listed above. For instance, in the example shown, a number representative of the performance metric MAX_RECORDS is shown. A large number of maximum records may suggest that data records are accumulating in the queue, which may indicate that there is a problem with a subscribing job.

Subscribers. The name of each subscriber to a queue may be displayed along with the number of records remaining for each subscriber, issues associated with each subscriber, or other information associated with subscribers. The subscriber name may be an active link such that selecting (e.g., by clicking, tapping, using a pointing device such as a mouse to hover over, etc.) a subscriber name may open a subscriber dialog box with further information about the subscriber, as described below.

Publishing jobs. The name, status, or other information for each publishing job associated with a queue may be displayed. The job name may be an active link such that selecting (e.g., by clicking, tapping, using a pointing device such as a mouse to hover over, etc.) a job name may open a job dialog box with further information about the job, as described below.

In the queue connections diagram 500, the status of the two subscribers 506, 508 of the queue 504 (labeled "testqueue1") is shown. The subscriber 506 (labeled "one") drained the queue such that there are no records left in the queue 504 (labeled "testqueue1") for subscriber 506 (labeled "one") (depicted as "0 recs"). A success icon 510a (e.g., a blue dot, a green dot, or another icon indicative of success) indicates that the data processing application 510 (labeled "subscribe1.pset") corresponding to the subscriber 506 (labeled "one") ran successfully. The subscriber 508 (labeled "two") failed to drain the queue 504 (labeled "testqueue1") and there are 398 records remaining in the queue 504 (labeled "testqueue1") for subscriber 508 (labeled "two"; depicted as "398 recs"). A failure icon 512a (e.g., a red dot, a black dot, or another icon indicative of failure) indicates that the data processing application 512 (labeled "subscribe2.pset") corresponding to the subscriber 508 (labeled "two") failed to run correctly. An alert icon 522 indicates that an error occurred during the execution of the data processing application 512 (labeled "subscribe2.pset").

FIG. 6 shows an example of a tabular representation 600 (also referred to as a queue grid view) of the same data processing environment depicted in the graphical representation 500 of FIG. 5. The queue grid view may include some or all of the same information included in the queue connections view. One row of data corresponds to each monitored queue; columns provide information for the corresponding queue, such as, e.g., its connections to publishers and subscribers; status information for the queue, its subscribers, and/or its publishers; status information for jobs; and other information. The queue grid view may be useful, e.g., to visualize data processing environments having many data processing applications and/or many queues. The queue grid view also enables sorting, searching, and scaling operations.

A queue grid view, such as the queue grid view 600, includes information about the queues and data processing applications included in the queue grid view. In some examples, a user may select the information to be displayed in the queue grid view. For instance, example information included in a queue grid view may include some or all of the following information:

The name of each queue depicted in the queue grid view.

The host with which each queue is associated. For instance, the name of the filesystem run host with which each queue is associated may be listed.

Queue or data processing application status. Issues, such as errors or alerts, associated with a queue or a data processing application, may be depicted by indicators, such as icons, color indicators, or other type of indicator. For instance, an indicator may indicate the number of issues associated with a queue or a data processing application, the degree of severity of the most severe issue, or another indication of an issue.

Performance metrics, such as the performance metrics listed above.

Last job. The name of the last job to have read data from each subscriber. The job name may be an active link such that selecting (e.g., by clicking, tapping, using a pointing device such as a mouse to hover over, etc.) a job name may open a job dialog box with further information about the job.

Job status. The status of the currently connected job, if any exists; or the status of the last job to have been connected, if no job currently exists.

Job issues. Issues associated with the current or last job.

Associated system, such as an associated operating system.

Figure 7:
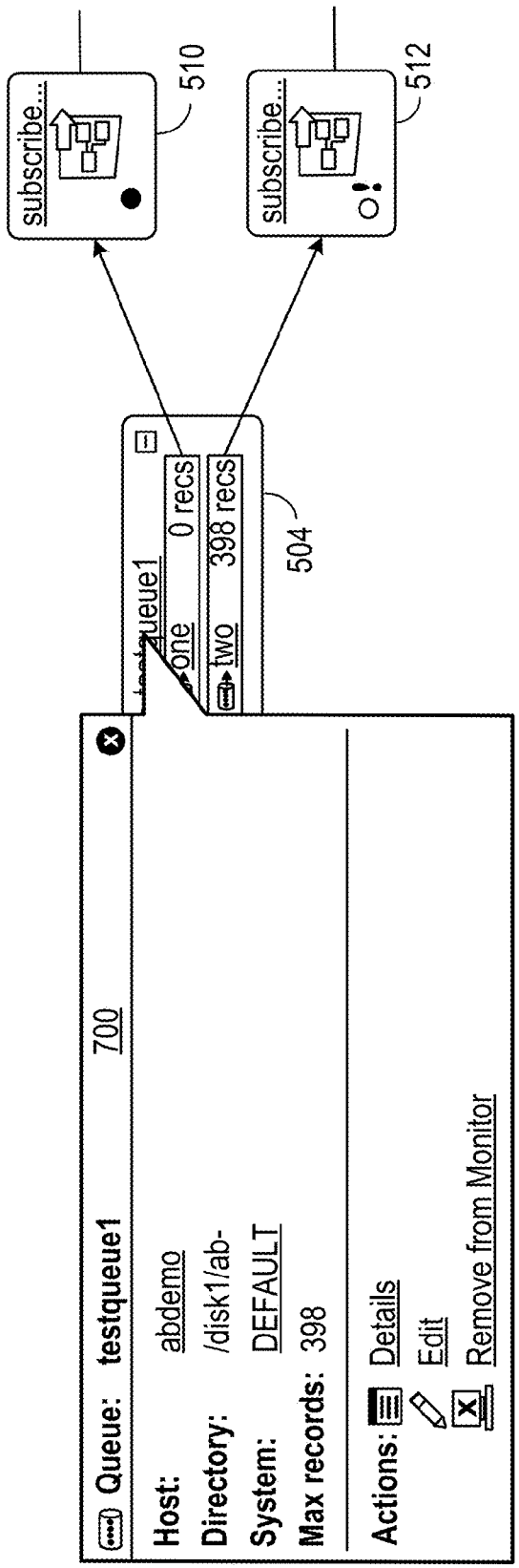

FIG. 7 shows a queue dialog box 700 showing details about a particular queue (also referred to as a queue details view), in this example the queue 504 (labeled "testqueue1"). The dialog box 700 for a particular queue can be obtained by selecting on the queue name from the queue connections diagram or from the queue grid view. The queue details view may provide some or all of the information that is displayed in the queue connections diagram and/or the queue grid view, and may also provide some or all of the following additional information about the particular queue:

Directory. The location in the host file system where the queue was created.

System. The execution environment (e.g., execution environment 104 in FIG. 1) to which the queue is assigned.

Type of queue. Various types of queues are possible, such as, e.g., a standard queue or a recycle_queue Version. Software version of the queue.

Partitions. Number of partitions in the queue multi-directory.

Attributes. A list of the attributes assigned to the queue at the time of its creation. Attributes may include, e.g., whether the queue data is compressed, whether the queue includes empty file to mark checkpoints or compute points in which no data was received, or other attributes.

Notification groups. The names of any warning and error notification groups with which the queue is associated.

FIG. 8 shows a tabular view 800 showing details about a particular queue, in this example the queue 504. The tabular view 800 for a particular queue can be obtained by selecting the "Details" link in the queue details view 700. The tabular view 800 provides information about the queue, such as some or all of the information listed above. For example, the tabular view 800 may include information about publishers and subscribers to the queue, metrics for the queue, etc. For instance, in the depicted example, it can be seen that the data processing application 512 (labeled "subscribe2.pset") associated with the subscriber 508 (labeled "two") is in error. In this example, as was shown in FIG. 5, the data processing application 512 (labeled "subscribe2.pset") failed to run correctly and the subscriber 508 (labeled "two") failed to drain the queue 504 (labeled "testqueue1").

Figure 9:
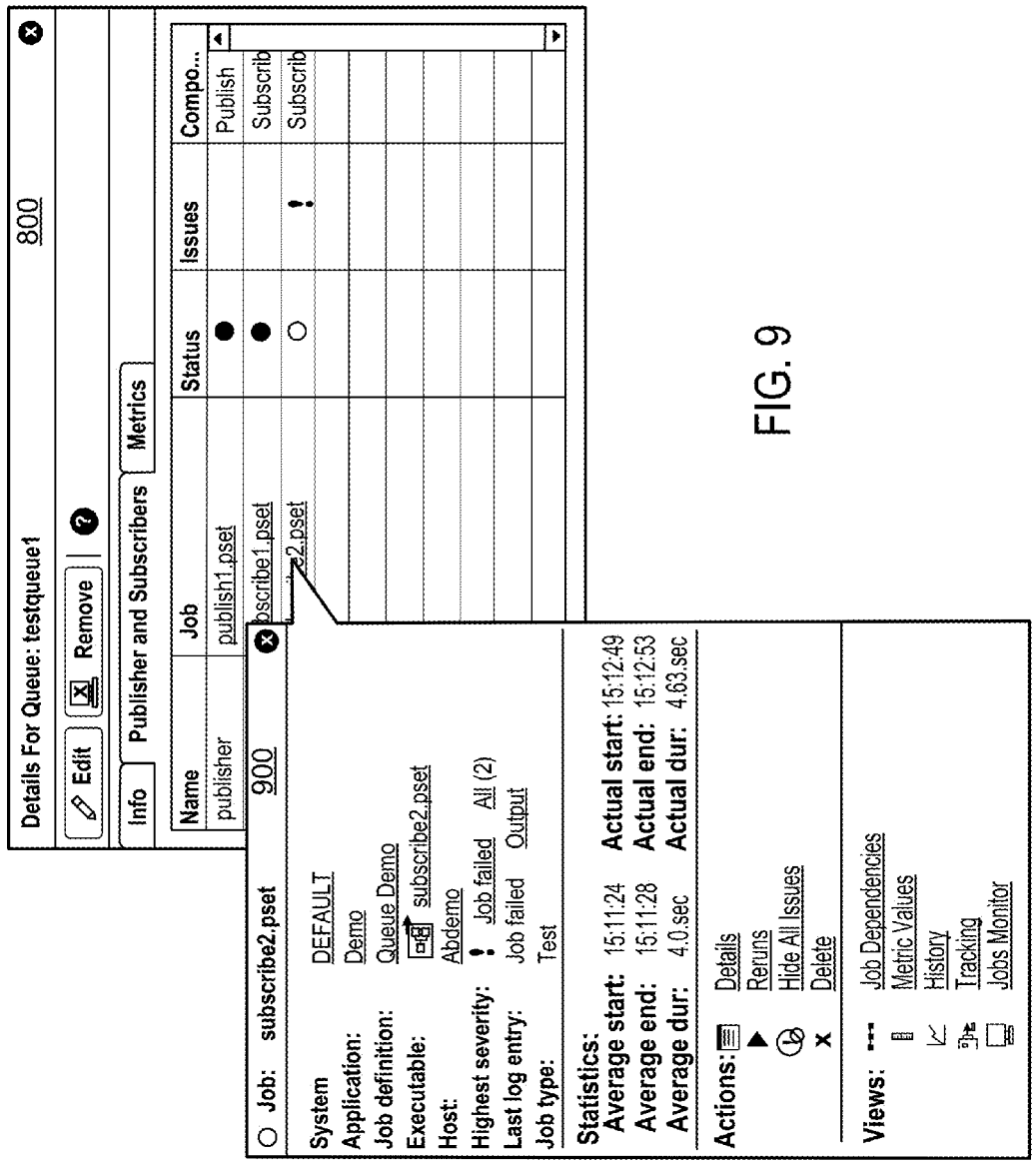

FIG. 9 shows a job dialog box 900 showing information about a job corresponding to a particular subscriber (referred to as a job details view). The job dialog box 900 can be obtained by selecting the name of the subscriber, e.g., from the queue connections view 500, the queue grid view 600, or the tabular view 800. For instance, in the depicted example, the dialog box 900 shows information about the data processing application 513 (labeled "subscribe2.pset") corresponding to the subscriber 508 (labeled "two"). The dialog box 900 shows information including, e.g., system details for the data processing application, status indicators, performance statistics, and other types of information for the data processing application.

FIG. 10 shows a tabular view 10 showing details about queues associated with a particular data processing application, in this case the data processing application 512 (labeled "subscribe2.pset"). The tabular view 10 for a particular data processing application can be obtained by selecting the "Details" link in the data processing application details view 900. For instance, in the depicted example, the tabular view 10 shows that the data processing application 512 (labeled "subscribe2.pset") reads from the queue 504 (labeled "testqueue1") and writes to the queue 518 (labeled "testqueue3") 518.

In some cases, a data processing environment may include queues and/or data processing applications that include restricted information. This restricted information may not be displayed in a visual representation of the data processing environment. For instance, a user may have access to a first system but not to a second system. If jobs from both the first system and the second system subscribe to a particular queue that is displayed on a visual representation to the user, no information may be displayed about the jobs from the second system that subscribe to the queue.

Figure 11:
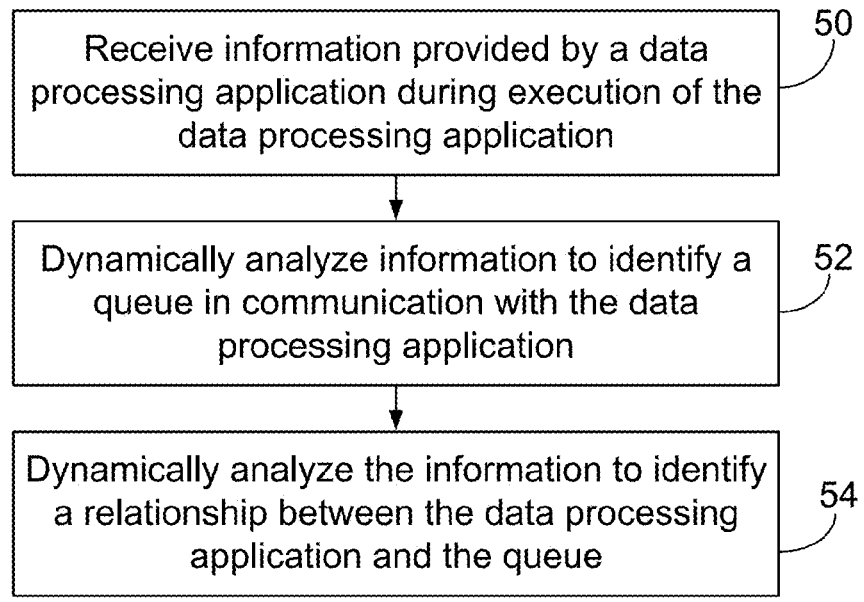
FIGS. 11 and 12 are flowcharts.

Referring to FIG. 11, in an example process, information provided by a data processing application during execution of the data processing application is received (50). The information is indicative of at least one of a source of data for the data processing application and a destination of data for the data processing application. For instance, the information may identify a queue.

The information is dynamically analyzed during execution of the data processing application to identify a queue in communication with the data processing application (52). The information is dynamically analyzed during execution of the data processing application to identify a relationship between the data processing application and the queue is identified (54). For instance, the queue may be the source of data for the data processing application (i.e., the data processing application subscribes to the queue). The queue may be the destination of data from the data processing application (i.e., the data processing application publishes to the queue).

In some examples, a status of the queue and/or the data processing application may be determined, e.g., dynamically determined during execution of the data processing application.

Figure 12:
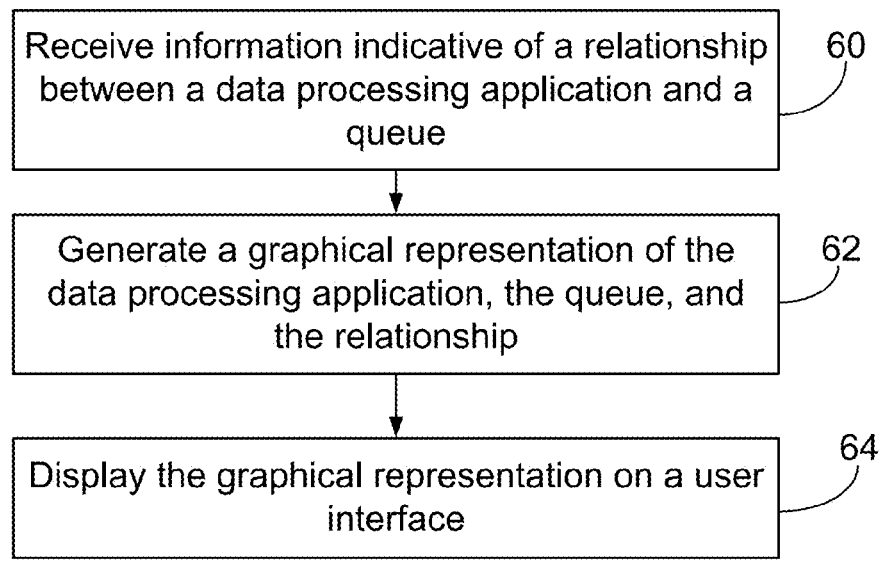

Referring to FIG. 12, in an example process, information indicative of a relationship between a data processing application and a queue is received from a data processing application during execution of the data processing applicaiton (60). The relationship includes at least one of the queue being a source of data for the data processing application and the queue being a destination of data from the data processing application. In some cases, information may be received indicative of relationships among a plurality of data processing applications and a plurality of queues.

A graphical representation of the data processing application, the queue, and the relationship between the data processing application and the queue is generated (62) and the graphical representation is displayed on a user interface during execution of the data processing application (64). In some cases, the graphical representation may include a first node to represent the data processing application, a second node to represent the queue, and a connection between the data processing application and the queue to represent the relationship. In some cases, a status of the queue can be determined and a representation of the status can be included in the graphical representation, or a notification can be provided based on the status.

In one example implementation, the queue monitoring and visualization techniques described herein can be applied to the processing of telephone records for billing purposes. Large numbers of telephone records can be processed by a billing system to generate telephone bills. The ability to visualize the occurrence and location of potential errors during processing can help to ensure accuracy and efficiency of the billing process.

The queue monitoring and visualization techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method including:
receiving information provided by a data processing application during execution of the data processing application, the data processing application configured to process one or more data records each having one or more fields, wherein the information is indicative of at least one of a source of data records to be processed by the data processing application and a destination of data records having been processed by the data processing application;
dynamically analyzing the information during execution of the data processing application to identify a queue in communication with the data processing application;
dynamically analyzing the information during execution of the data processing application to identify a relationship between the data processing application and the queue, including at least one of identifying that the queue is the source of data records to be processed by the data processing application and identifying that the queue is the destination of data records having been processed by the data processing application; and
providing an output indicative of a status of the queue.

2. The computer-implemented method of claim 1, wherein the information indicative of at least one of the source of data and the destination of data includes an identifier of the queue.

3. The computer-implemented method of claim 1, including dynamically determining the status of the queue during execution of the data processing application.

4. The computer-implemented method of claim 1, wherein providing an output indicative of the status of the queue includes providing a notification based on the status of the queue.

5. The computer-implemented method of claim 1, wherein the status of the queue includes at least one of number of data records in the queue and an elapsed time associated with the queue.

6. The computer-implemented method of claim 1, including:
determining a status of the data processing application; and
providing an output indicative of the status of the data processing application.

7. The computer-implemented method of claim 1, including receiving an input identifying the queue.

8. The computer-implemented method of claim 7, including identifying the data processing application based on the processing and based on the input identifying the queue.

9. The computer-implemented method of claim 1, wherein the one or more data processing applications include computation graphs.

10. The computer-implemented method of claim 1, including generating a visual representation of the data processing application, the queue, and the relationships between the data processing application and the queue.

11. The computer-implemented method of claim 10, including displaying the visual representation on a user interface.

12. The computer-implemented method of claim 10, wherein the visual representation includes a representation of the status of the queue.

13. The computer-implemented method of claim 1, wherein the information provided by the data processing information is distinct from the data records processed by the data processing application.

14. A non-transitory computer-readable medium, including instructions for causing a computer system to:
receive information provided by a data processing application during execution of the data processing application, the data processing application configured to process one or more data records each having one or more fields, wherein the information is indicative of at least one of a source of data records to be processed by the data processing application and a destination of data records having been processed by the data processing application;
dynamically analyze the information during execution of the data processing application to identify a queue in communication with the data processing application; and
dynamically analyze the information during execution of the data processing application to identify a relationship between the data processing application and the queue, including at least one of identifying that the queue is the source of data records to be processed by the data processing application and identifying that the queue is the destination of data records having been processed by the data processing application; and
providing an output indicative of a status of the queue.

15. The non-transitory computer-readable medium of claim 14, wherein the information indicative of at least one of the source of data and the destination of data includes an identifier of the queue.

16. The non-transitory computer-readable medium of claim 14, including instructions for causing the computer system to dynamically determine the status of the queue during execution of the data processing application.

17. The non-transitory computer-readable medium of claim 14, wherein providing an output indicative of the status of the queue includes providing a notification based on the status of the queue.

18. The non-transitory computer-readable medium of claim 14, wherein the status of the queue includes at least one of number of data records in the queue and an elapsed time associated with the queue.

19. The non-transitory computer-readable medium of claim 14, including instructions for causing the computing system to:

determine a status of the data processing application; and
provide an output indicative of the status of the data processing application.

20. The non-transitory computer-readable medium of claim 14, including instructions for causing the computing system to receive an input identifying the queue.

21. The non-transitory computer-readable medium of claim 14, including instructions for causing the computing system to:
generate a visual representation of the data processing application, the queue, the relationships between the data processing application and the queue, and the status of the queue; and
display the visual representation on a user interface.

22. A computing system including:
an input port configured to receive information provided by a data processing application during execution of the data processing application, the data processing application configured to process one or more data records each having one or more fields, wherein the information is indicative of at least one of a source of data records to be processed by the data processing application and a destination of data records having been processed by the data processing application; and
at least one processor coupled to a memory, the processor and memory configured to:
dynamically analyze the information during execution of the data processing application to identify a queue in communication with the data processing application;
dynamically analyze the information during execution of the data processing application to identify a relationship between the data processing application and the queue, including at least one of identifying that the queue is the source of data records to be processed by the data processing application and identifying that the queue is the destination of data records having been processed by the data processing application; and
providing an output indicative of a status of the queue.

23. The computing system of claim 22, wherein the information indicative of at least one of the source of data and the destination of data includes an identifier of the queue.

24. The computing system of claim 22, wherein the processor and memory are configured to dynamically determine the status of the queue during execution of the data processing application.

25. The computing system of claim 22, wherein providing an output indicative of the status of the queue includes providing a notification based on the status of the queue.

26. The computing system of claim 22, wherein the status of the queue includes at least one of number of data records in the queue and an elapsed time associated with the queue.

27. The computing system of claim 22, wherein the processor and memory are configured to:
determine a status of the data processing application; and
provide an output indicative of the status of the data processing application.

28. The computing system of claim 22, wherein the processor and memory are configured to receive an input identifying the queue.

29. The computing system of claim 22, wherein the processor and memory are configured to:
generate a visual representation of the data processing application, the queue, the relationships between the data processing application and the queue, and the status of the queue; and
display the visual representation on a user interface.

30. A computing system including:
means for receiving information provided by a data processing application during execution of the data processing application, the data processing application configured to process one or more data records each having one or more fields, wherein the information is indicative of at least one of a source of data records to be processed by for the data processing application and a destination of data records having been processed by the data processing application;
means for dynamically analyzing the information during execution of the data processing application to identify a queue in communication with the data processing application;
means for dynamically analyzing the information during execution of the data processing application to identify a relationship between the data processing application and the queue, including at least one of identifying that the queue is the source of data for the data processing application and identifying that the queue is the destination of data from the data processing application; and
means for providing an output indicative of a status of the queue.

31. A computer-implemented method including:
receiving, from a data processing application configured to process one or more data records each having one or more fields, during execution of the data processing application, information indicative of a relationship between the data processing application and a queue, wherein the relationship includes at least one of the queue being a source of data records to be processed by the data processing application and the queue being a destination of data records having been processed by the data processing application;
generating a graphical representation of the data processing application, the queue, the relationship between the data processing application and the queue, and a status of the queue;
displaying, on a user interface, during execution of the data processing application, the graphical representation of the data processing application, the queue, the relationship between the data processing application and the queue, and the status of the queue.

32. The computer-implemented method of claim 31, wherein the graphical representation includes a first node to represent the data processing application, a second node to represent the queue, and a connection between the data processing application and the queue to represent the relationship.

33. The computer-implemented method of claim 32, including displaying information about the data processing application responsive to user selection of the first node.

34. The computer-implemented method of claim 32, including displaying information about the queue responsive to user selection of the second node.

35. The computer-implemented method of claim 31, including dynamically determining the status of the queue during execution of the data processing system.

36. The computer-implemented method of claim 31, including providing a notification based on the status of the queue.

37. The computer-implemented method of claim 31, wherein the status of the queue includes at least one of a number of data records in the queue and an elapsed time associated with the queue.

38. The computer-implemented method of claim 31, including dynamically determining a status of the data processing application during execution of the data processing application.

39. The computer-implemented method of claim 38, wherein the graphical representation includes a representation of the status of the data processing application.

40. The computer-implemented method of claim 31, including receiving, from a plurality of data processing applications, information indicative of a relationship between each data processing application and at least one corresponding queue; and
wherein generating a graphical representation includes generating a graphical representation of the plurality of data processing applications, the corresponding queues, the relationships, and the status of at least one of the queues.

41. The computer-implemented method of claim 31, wherein receiving information includes:
receiving information provided by the data processing application during execution of the data processing application, wherein the information is indicative of at least one of a source of the data records to be processed by the data processing application and a destination of data records having been processed by the data processing application; and
dynamically analyzing the information during execution of the data processing application to identify the queue and the relationship.

42. A non-transitory computer-readable medium, including instructions for causing a computing system to:
receive, from a data processing application configured to process one or more data records each having one or more fields, during execution of the data processing application, information indicative of a relationship between the data processing application and a queue, wherein the relationship includes at least one of the queue being a source of data records to be processed by the data processing application and the queue being a destination of data records having been processed by the data processing application;
generate a graphical representation of the data processing application, the queue, the relationship between the data processing application and the queue, and a status of the queue; and
display, on a user interface, during execution of the data processing application, the graphical representation of the data processing application, the queue, the relationship between the data processing application and the queue, and the status of the queue.

43. The non-transitory computer-readable medium of claim 42, wherein the graphical representation includes a first node to represent the data processing application, a second node to represent the queue, and a connection between the data processing application and the queue to represent the relationship.

44. The non-transitory computer-readable medium of claim 43, including instructions for causing the computing system to display information about the data processing application responsive to user selection of the first node.

45. The non-transitory computer-readable medium of claim 43, including instructions for causing the computing system to display information about the queue responsive to user selection of the second node.

46. The non-transitory computer-readable medium of claim 42, including instructions for causing the computing system to dynamically determine the status of the queue during execution of the data processing system.

47. The non-transitory computer-readable medium of claim 42, including instructions for causing the computing system to provide a notification based on the status of the queue.

48. The non-transitory computer-readable medium of claim 42, wherein the status of the queue includes at least one of a number of data records in the queue and an elapsed time associated with the queue.

49. The non-transitory computer-readable medium of claim 42, including instructions for causing the computing system to dynamically determine a status of the data processing application during execution of the data processing application.

50. The non-transitory computer-readable medium of claim 49, wherein the graphical representation includes a representation of the status of the data processing application.

51. A computing system including:
an input port configured to receive, from a data processing application configured to process one or more data records each having one or more fields, during execution of the data processing application, information indicative of a relationship between the data processing application and a queue, wherein the relationship includes at least one of the queue being a source of data records to be processed by the data processing application and the queue being a destination of data records having been processed by the data processing application; and
a processor coupled to a memory, the processor and memory configured to:
generate a graphical representation of the data processing application, the queue, the relationship between the data processing application and the queue, and a status of the queue; and
display, on a user interface, during execution of the data processing application, the graphical representation of the data processing application, the queue, the relationship between the data processing application and the queue, and the status of the queue.

52. The computing system of claim 51, wherein the graphical representation includes a first node to represent the data processing application, a second node to represent the queue, and a connection between the data processing application and the queue to represent the relationship.

53. The computing system of claim 52, wherein the processor and memory are configured to display information about the data processing application responsive to user selection of the first node.

54. The computing system of claim 52, wherein the processor and memory are configured to display information about the queue responsive to user selection of the second node.

55. The computing system of claim 51, wherein the processor and memory are configured to dynamically determine the status of the queue during execution of the data processing system.

56. The computing system of claim 51, wherein the processor and memory are configured to provide a notification based on the status of the queue.

57. The computing system of claim 51, wherein the status of the queue includes at least one of a number of data records in the queue and an elapsed time associated with the queue.

58. The computing system of claim 51, wherein the processor and memory are configured to dynamically determine a status of the data processing application during execution of the data processing application.

59. The computing system of claim 58, wherein the graphical representation includes a representation of the status of the data processing application.

60. A computing system including:
- means for receiving, from a data processing application configured to process one or more data records each having one or more fields, during execution of the data processing application, information indicative of a relationship between the data processing application and a queue, wherein the relationship includes at least one of the queue being a source of data records to be processed by the data processing application and the queue being a destination of data records having been processed by the data processing application;
- means for generating a graphical representation of the data processing application, the queue, the relationship between the data processing application and the queue, and a status of the queue; and
- means for displaying, on a user interface, during execution of the data processing application, the graphical representation of the data processing application, the queue, the relationship between the data processing application and the queue, and the status of the queue.

61. A computer-implemented method including:
- receiving information provided by a data processing application during execution of the data processing application, the data processing application configured to process one or more data records each having one or more fields, wherein the information is indicative of at least one of a source of data records to be processed by the data processing application and a destination of data records having been processed by the data processing application;
- dynamically analyzing the information during execution of the data processing application to identify a queue in communication with to the data processing application;
- dynamically analyzing the information during execution of the data processing application to identify a relationship between the data processing application and the queue, including at least one of identifying that the queue is the source of data records to be processed by the data processing application and identifying that the queue is the destination of data records having been processed by the data processing application;
- generating a graphical representation of the data processing application, the queue, the relationship between the data processing application and the queue, and a status of the queue; and
- displaying, on a user interface, during execution of the data processing application, the graphical representation of the data processing application, the queue, the relationship between the data processing application and the queue, and the status of the queue.

* * * * *

UNITED STATES PATENT AND TRADEMARK OFFICE
CERTIFICATE OF CORRECTION

PATENT NO. : 9,189,529 B2  
APPLICATION NO. : 13/834491  
DATED : November 17, 2015  
INVENTOR(S) : Mark Buxbaum and Tim Wakeling Page 1 of 1

It is certified that error appears in the above-identified patent and that said Letters Patent is hereby corrected as shown below:

<u>In the claims</u>

Col. 15, lines 65-66, claim 6, delete "including;" and insert -- including: --.

Col. 16, line 39, claim 14, after "application;" delete "and".

Signed and Sealed this  
Eighth Day of March, 2016

Michelle K. Lee  
*Director of the United States Patent and Trademark Office*